ELECTRICALLY CONTOLLED RF VARIABLE POWER DIVIDING NETWORK

Filed Sept. 9, 1966 2 Sheets-Sheet 1

INVENTOR.
Donald E. Allen
Hugh R. Malone
BY
Mueller, Aichele & Rauner
ATTY'S.

ELECTRICALLY CONTOLLED RF VARIABLE POWER DIVIDING NETWORK

Filed Sept. 9, 1966 2 Sheets-Sheet 2

INVENTOR.
Donald E. Allen
Hugh R. Malone
BY
Mueller, Aichele & Rauner
ATTY'S.

3,492,501
ELECTRICALLY CONTROLLED RF VARIABLE POWER DIVIDING NETWORK

Donald E. Allen and Hugh R. Malone, Scottsdale, Ariz., assignors to Motorola, Inc., Franklin Park, Ill., a corporation of Illinois Filed Sept. 9, 1966, Ser. No. 578,392
Int. Cl. H03k *17/02*
U.S. Cl. 307—244 4 Claims Electronic systems manipulating radio frequency signals often require a power-dividing network, such as an attenuator, capable of being rapidly controlled and which provides a continously matched input impedance. Such networks can be easily realized in small practical package sizes for frequencies above 500 megacycles. At frequencies less than 500 megacycles (including VHF–UHF frequencies) such components become impractical due to large physical size required at such lower frequencies.

Accordingly it is an object of this invention to provide a simple power dividing network capable of operating at VHF–UHF frequencies.

It is a still further object of this invention to provide an electrical signal controlled power-dividing network capable of operating at frequencies below 500 megacycles and yet be contained in a practical size package.

It is further object of this invention to provide a power-dividing network having a constant input impedance over wide attenuation ranges.

It is another object of this invention to provide an electrically-controlled power-dividing network for operation at lower frequencies and which exhibits relatively linear responses in power division with respect to changes in control voltages and operates in a symmetrical manner.

It is a still further object of this invention to provide an electrically-controlled power-dividing network which is continously impedance matched at various states of power division to a constant impedance and responds in a linearized manner to control signals.

Referring now to the accompanying drawing wherein.

Figure 1:
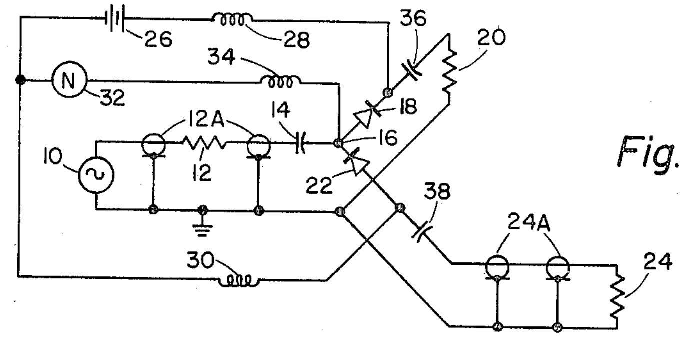
FIG. 1 is a schematic diagram illustrating an embodiment of the subject invention.
Figure 5:
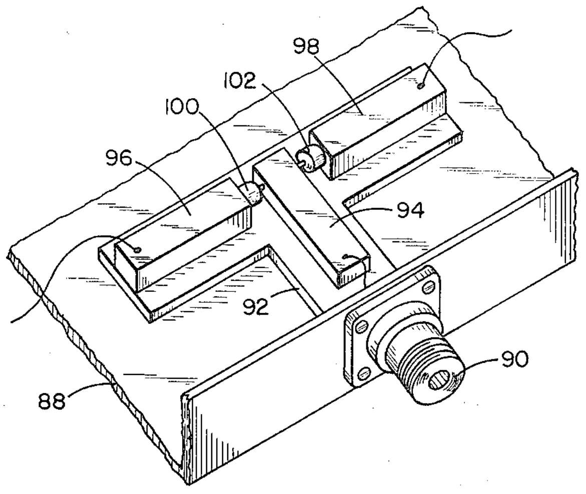

FIG. 5 illuustrates a heat sink arrangement for the FIG. 1 embodiment power-dividing diodes.

In practicing the subject invention two radio frequency diodes, such as PIN diodes, are biased to appear as pure resistances to an input signal frequency. The diodes are selected on the basis of their minority carrier lifetime being much longer than the period of the controlled signal; therefore, the input signal does not appreciably alter the resistance of the diodes. The diodes respectively lead to two output ports through which the input signal is respectively directed according to the impedances of the two diodes; i.e., provides power division. The biases across the diodes are symmetrically oppositely varied to provide a constant input impedance to the network; that is, the bias on one diode is increased when the bias on the other diode is decreased.

The diode biasing network may include resistors in parallel circuit and series circuit relationship to diodes for making the power division characteristic of the network vary linearly with respect to diode bias(es).

The network may be used as a modulator wherein the signal to be modulated is applied to the input junction of the two diodes. One output port will receive a modulated signal modulated in a first phase while the other output port will receive a modulated signal modulated in an opposite phase to the first port received signal modulation.

The power-dividing network of FIG. 1 receives an input RF signal from source 10 through a coaxial cable, schematically indicated by numeral 12A having a characteristic resistance 12. Normally the resistance 12 is the characteristic impedance of the system (not shown) in which the power-dividing network is connected. A DC blocking capacitor 14 may be inserted between coaxial cable 12A and input junction 16 to isolate source 10 from later described biasing circuits. A first electrically variable resistor of RF diode 18 transfers power from input junction 16 to load 20 which has an impedance equal to the system characteristic impedance. A second diode 22 connects input junction 16 to load 24 through a coaxial cable 24A. Load 24 also has an impedance equal to the system characteristic impedance. Load 24, in a practical application would be the input impedance of a following component. In this illustration the power-dividing network is used as an attenuator between source 10 and load 24.

The RF input power at junction 16 is supplied to the two loads 20, 24 according to the relative impedances of diodes 18 and 22. As the impedance of diode 18 increases, as by increasing the reverse bias (or decreasing the forward bias) of the diode, the power is diverted to load 24. Using this invention, an attenuation range from 1 to 30 db. was obtained between source 10 and load 24. The maximum standing wave ratio for any attenuation value was 1.6. At an attenuation of 6 db. the power dissipation in the RF diodes was equal to one-fourth of the power being controlled. The input power was divided equally between the loads, 10 and 24, and the diodes. Therefore, the power dissipated by the two diodes 18 and 22 was equal to one-quarter of the power available from source 10. Operation of the diodes was as a pure resistance; i.e., the impedance was real.

Several forms of circuit means may be used to provide the desired bias to the RF diodes for causing the diodes to exhibit pure resistances. One form is shown in FIG. 1 wherein constant voltage source 26, which may be a battery, is connected between RF chokes 28 and 30 to provide a constant potential difference between the uncommon terminal of diodes 18 and 22. The power division between loads 20 and 24 is determined by control signal source 32 connected between RF choke 34; i.e., input junction 16, and the negative terminal of DC source 26. It is apparent that control voltage source 32 will control the bias between input junction 16 and RF choke 30 and thereby the bias across both diodes 18 and 22.

By using source 32 to provide a modulating signal, the power-dividing network becomes an amplitude modulator As the net forward bias across diode 22 is decreased the power to load 24 is decreased providing a "valley" or low amplitude in amplitude madulation while when the net forward bias is increased the amplitude to load 24 is increased. The percentage of the incident RF power directed to load 20 is exactly opposite in changes as that applied to load 24 and therefore 180° out of phase.

DC blocking capacitors 36 and 38 are inserted to provide DC isolation between the bias circuits (source 26) and the loads 20 and 24.

Figure 2:
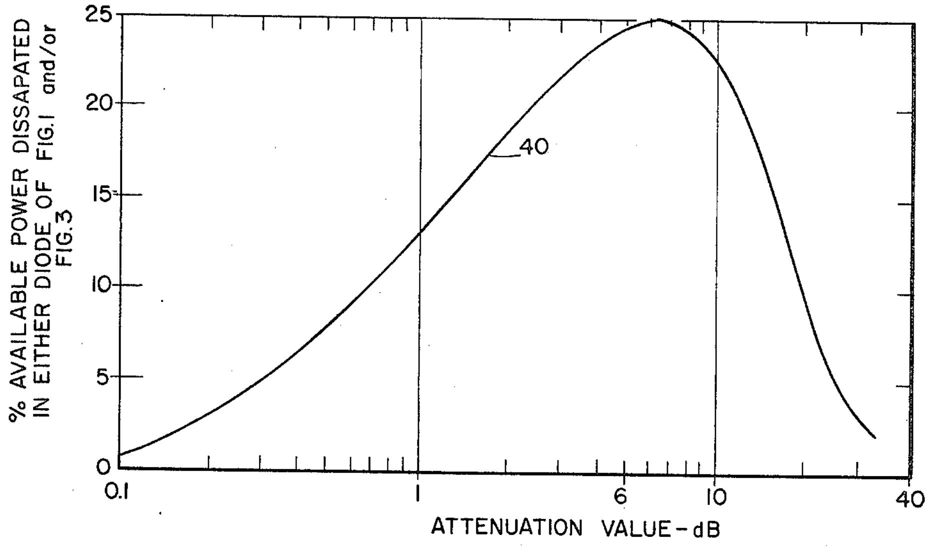
FIG. 2 is a graph showing certain response characteristics of the FIG. 1 embodiment.

Referring now to FIG. 2, the graph line 40 shows power dissipated in either diode 18 or 22 (FIG. 1) as a function of attenuation. The maximum power dissipated is at the 6 db. attenuation point.

Figure 3:
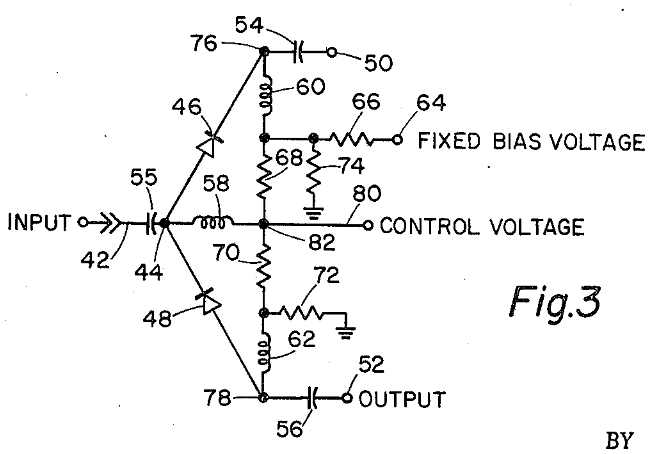
FIG. 3 is a schematic diagram of an embodiment of the subject invention utilizing a single control voltage for controlling two power dissipating electrically variable resistors, shown as RF diodes.

FIG. 3 illustrates a power-dividing network having a linearized change in the signal attenuation for a corresponding change in control voltage and is also characterized by its input impedance being constant. The signal to be subjected to power division or attenuation is supplied over line 42 to input junction 44. A pair of diodes 46 and 48 respectively pass the signal to output ports 50 and 52. It should be noted that the cathode of diode 48 is connected to input junction 44, while the anode of diode 46 is connected to said junction. This arrangement enables a single control voltage to control the impedances of both diodes and yet provide a fast relatively linear response. Capacitors 54 and 56 respectively provide DC isolation between the output ports and the bias circuitry herein described. Capacitor 55 isolates the input port from the bias circuits. RF chokes 58, 60 and 62 respectively connect bias circuitry to junction 44 and to the diodes 46 and 48. A fixed voltage is supplied over line 64 through a voltage dividing network consisting of resistors 66, 68, 70, 72 and 74 for providing reference voltages to junctions 76, 78 and 44. A control or modulating signal is supplied over line 80 to junction 82, thence through choke 58 to input junction 44 for simultaneously and symmetrically oppositely altering the bias on diodes 46 and 48.

The bias resistors described above cooperate with the diodes to provide a linearizing effect on the response of the network to a change in control voltage as applied to line 80. Resistors 68 and 70 are respectively in parallel DC circuit relationship to diodes 46 and 48. By reducing the impedance in this manner a change in diode resistance for a given change in control voltage will be lessened making network response more linear.

Figure 4:
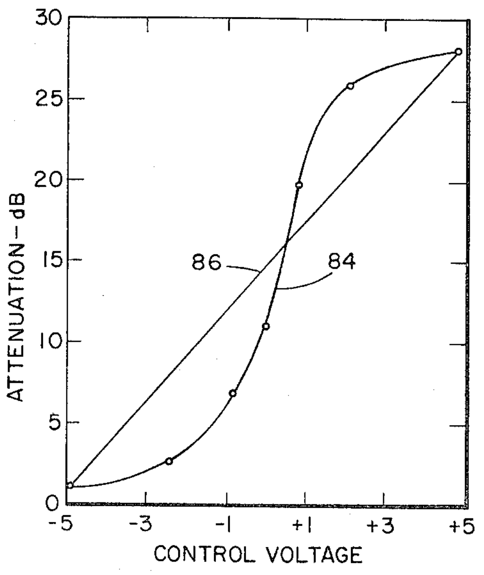
FIG. 4 is a graph showing the non-linearity of diode response to control voltage.

FIG. 4 is a graph including line 84 illustrating the nonlinear variation of attenuation as a function of control voltage. Using the FIG. 3 bias network as above described (rather than the FIG. 1 bias network) tends to make the network response a straight line (linear) 86 rather than curved (non-linear).

Referring now to FIG. 5 there is illustrated a portion of a physical embodiment particularly adapted to dissipate heat from the semiconductor diodes. A conductive portion 88 of a chassis (not shown) forms a ground plane for the circuit. Mounted on portion 88 is a coaxial connector 90 for receiving an input RF signal and a T-shaped insulating slab 92. Slab 92 forms the insulation in three strip lines formed by conductors 94, 96 and 98 spaced from ground plane portion 88 by slab 92. Beryllium oxide is used to form T-slab 92 to provide high electrical insulation and good thermal conduction between the strip line conductors and ground plane portion 88. The diodes 100 and 102 are securely mounted between the three conductors as shown to provide good electrical and thermal connections therebetween. The diode generated heat is dissipated through conductor portions 94, 96, 98 thence through slab 92 into ground plane 88 to form heat sink.

What is claimed is:

1. A power dividing network which comprises:

(a) first and second input terminals, said input terminals providing an input port;

(b) first and second output terminals, said output terminals providing a first output port;

(c) third and fourth output terminals, said output terminals providing a second output port;

(d) a first diode coupled between said first input terminal and said first output terminal, said diode being poled when forward biased to conduct current to said first output terminal;

(e) a second diode coupled between said first input terminal and said third output terminal and poled when forward biased to conduct current to said first input terminal;

(f) D.C. blocking means interposed between said diodes and adjacent input and output terminals;

(g) biasing means coupled across the combination of said first and second diodes for applying a constant potential thereacross; and (h) control voltage means coupled to the junction between said first and second diodes for varying the distribution of the bias potential across said diodes whereby the distribution of power at said first and second output ports is varied accordingly.

2. The combination of claim 1 wherein said biasing means includes a voltage divider wherein a pair of taps on said voltage divider provide first, second, third and fourth series connected resistors, said second and third resistors connected between said diodes remote from said junction for providing a constant potential difference therebetween and being respectively in parallel circuit relationship to said diodes for providing a more linear response therein, and said junction between diodes being DC connected to said divider at a point intermediate the second and third resistors.

3. The combination of claim 1 further comprising:

(a) resistive means coupled in DC electrical parallel with said diodes for increasing the linearity of the network response, (b) R.F. blocking means for isolating said resistive means from said input and output ports.

4. The combination of claim 3 wherein said diodes are PIN diodes.

References Cited

UNITED STATES PATENTS

| | | | |
|---|---|---|---|
| 2,439,651 | 4/1948 | Dome | 333—7 |
| 2,577,015 | 12/1951 | Johnson | 307—259 |
| 2,782,307 | 2/1957 | Von Sivers | 307—259 |
| 2,812,451 | 11/1957 | Curtis | 307—259 |
| 2,981,832 | 4/1961 | Mattson | 307—259 |
| 2,946,024 | 7/1960 | Mills | 333—7 |
| 3,183,373 | 5/1965 | Sakurai | 333—7 |
| 3,289,120 | 11/1966 | Anders et al. | 307—237 |
| 3,374,364 | 3/1968 | Concelman | 333—7 |

DONALD D. FORRER, Primary Examiner

H. A. DIXON, Assistant Examiner

U.S. Cl. X.R.

333—7, 81; 307—257, 319